United States Patent
Oshima et al.

(10) Patent No.: US 9,910,750 B2
(45) Date of Patent: Mar. 6, 2018

(54) STORAGE CONTROLLING DEVICE, STORAGE CONTROLLING METHOD, AND NON-TRANSITORY COMPUTER-READABLE RECORDING MEDIUM

(71) Applicant: FUJITSU LIMITED, Kawasaki-shi, Kanagawa (JP)

(72) Inventors: Hikari Oshima, Kawasaki (JP); Toshio Yasutake, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 15/208,024

(22) Filed: Jul. 12, 2016

(65) Prior Publication Data
US 2017/0017557 A1    Jan. 19, 2017

(30) Foreign Application Priority Data
Jul. 17, 2015    (JP) .................................. 2015-143119

(51) Int. Cl.
G06F 11/00    (2006.01)
G06F 11/20    (2006.01)
G06F 3/06    (2006.01)

(52) U.S. Cl.
CPC ........ *G06F 11/2094* (2013.01); *G06F 3/0619* (2013.01); *G06F 3/0653* (2013.01); *G06F 3/0689* (2013.01); *G06F 2201/805* (2013.01)

(58) Field of Classification Search
CPC ............. G06F 11/1092; G06F 11/1096; G06F 11/2094

(Continued)

(56) References Cited

U.S. PATENT DOCUMENTS

2005/0283655 A1    12/2005    Ashmore
2013/0047028 A1*    2/2013    Daikokuya ......... G06F 11/0727
                                                              714/6.3

(Continued)

FOREIGN PATENT DOCUMENTS

JP    2008-509474    3/2008
JP    2010-128773    6/2010

OTHER PUBLICATIONS

Update of CDI—"Shyuukai Okure No Nikki", Retrieved on Jun. 2, 2015, <htpp://d.hatena.ne.jp/hinkyaku49/20131018/1382104290> Partial Translation (6 pages).

(Continued)

*Primary Examiner* — Sarai E Butler
(74) *Attorney, Agent, or Firm* — Fujitsu Patent Center

(57) ABSTRACT

A storage controlling device including a memory and a processor configured to obtain information on each of a plurality of remaining lives of each of a plurality of storage devices included in a redundancy storage system, determine each of a plurality of timings for replacement of each of the plurality of storage devices so that a number of the timings for replacement included in a predetermined time range is less than a predetermined number, each of a plurality of timings for replacement being determined to be earlier than each of the plurality of timings that malfunctions occur in each of the plurality of storage devices corresponding to each of a plurality of timings for replacement, each of the plurality of timings that malfunctions occur being specified based on the obtained information, and output information that indicates at least one of the plurality of determined timings for replacement.

7 Claims, 15 Drawing Sheets

(58) Field of Classification Search
USPC .......................................... 714/6.32, 6.3, 4.11
See application file for complete search history.

(56) References Cited

U.S. PATENT DOCUMENTS

| | | | | |
|---|---|---|---|---|
| 2014/0032959 | A1* | 1/2014 | Dawkins ............. | G06F 11/2048 714/6.3 |
| 2014/0337664 | A1* | 11/2014 | Gokhale ............. | G06F 11/1464 714/6.3 |
| 2015/0205667 | A1* | 7/2015 | Bonwick ............. | G06F 11/1076 714/6.24 |

OTHER PUBLICATIONS

Blog Archive—"Shirokuro Nyanko Kedamadan", Retrieved on Jun. 2, 2015, <http://majimegawa.com/blog/nyanko/archives/1630> Partial Translation (8 pages).

* cited by examiner

| HDD Status | HDD#0 | HDD#1 | HDD#2 | HDD#3 | UNIT |
|---|---|---|---|---|---|
| CURRENT VALUE | 40.5 | 39.6 | 67.4 | 67.3 | % |
| THRESHOLD VALUE | 36 | 36 | 36 | 36 | % |
| RAW VALUE | 1309 | 1329 | 717 | 719 | NUMBER |
| UPDATE TIME | 2015/03/03 14:30 | | | | TIME |

FIG. 10

| HDD Status | | HDD#0 | HDD#1 | HDD#2 | HDD#3 | UNIT |
|---|---|---|---|---|---|---|
| 331A | RAW VALUE (INFORMATION STORAGE TABLE (A)) | 1309 | 1329 | 717 | 719 | NUMBER |
| 331B | RAW VALUE (INFORMATION STORAGE TABLE (B)) | 1308 ←UPDATED | 1329 | 717 | 719 | NUMBER |
| 332 | TIME-OF-CHANGE STORAGE TABLE | 2015/03/03 14:30 | 2015/02/21 21:15 | 2015/02/05 4:00 | 2015/02/05 8:45 | TIME |

FIG. 11

| HDD Status | | HDD#0 | HDD#1 | HDD#2 | HDD#3 | UNIT |
|---|---|---|---|---|---|---|
| 331A | CURRENT VALUE | 40.5 | 39.6 | 67.4 | 67.3 | % |
| | THRESHOLD VALUE | 36 | 36 | 36 | 36 | % |
| 334 | EARLY REPLACEMENT COEFFICIENT TABLE | 0 | 0 | 0 | 0 | % |
| 333 | REMAINING LIFE TABLE | 4.5 | 3.6 | 31.4 | 31.3 | % |

FIG. 13

| HDD Status | HDD#0 | HDD#1 | HDD#2 | HDD#3 | UNIT |
|---|---|---|---|---|---|
| TIME-OF-CHANGE STORAGE TABLE | 2015/03/03 14:30 | 2015/02/21 21:15 | 2015/02/05 4:00 | 2015/02/05 8:45 | TIME |
| EARLY REPLACEMENT COEFFICIENT TABLE | −2 | 0 | 0 | 0 | % |

332 — TIME-OF-CHANGE STORAGE TABLE
334 — EARLY REPLACEMENT COEFFICIENT TABLE

FIG. 14

| HDD Status | HDD#0 | HDD#1 | HDD#2 | HDD#3 | UNIT |
|---|---|---|---|---|---|
| REMAINING LIFE TABLE (BEFORE UPDATING) | 4.5 | 3.6 | 31.4 | 31.3 | % |
| EARLY REPLACEMENT COEFFICIENT TABLE (AFTER UPDATING) | -2 | 0 | 0 | 0 | |
| REMAINING LIFE TABLE (AFTER UPDATING) | 2.5 | 3.6 | 31.4 | 31.3 | % |

333
334
333'

STORAGE CONTROLLING DEVICE, STORAGE CONTROLLING METHOD, AND NON-TRANSITORY COMPUTER-READABLE RECORDING MEDIUM

CROSS-REFERENCE TO RELATED APPLICATIONS

This application is based upon and claims the benefit of priority of the prior Japanese Patent Application No. 2015-143119, filed on Jul. 17, 2015, the entire contents of which are incorporated herein by reference.

FIELD

The embodiment discussed herein is related to a storage controlling device, a storage controlling method, and a non-transitory computer-readable recording medium.

BACKGROUND

In the related art, there is redundant arrays of inexpensive disks (RAID) technology in which a combination of multiple storage devices are operated as a virtual disk. Disks, which are formed by RAID levels higher than or equal to RAID 1, have redundancy, and even if several storage devices malfunction, data can be recovered from other storage devices. In contrast, in a state where redundancy is lost, and one or more storage devices malfunction, in a so-called multi-dead state, data may not be recovered. Some storage devices may have a self-monitoring, analysis and reporting technology (SMART) function as a function for predicting a malfunction caused by degradation over time.

According to related technology in the related art, self-monitoring, analysis and reporting technology (SMART) data may be requested from one disk among a redundant array of multiple disks. There is technology in which SMART information regarding data disks and a spare disk is obtained, it is predicted if there are any data disks which are highly likely to malfunction among the data disks, and data of a data disk, which is highly likely to malfunction, is copied onto the spare disk.

SUMMARY

According to an aspect of the invention, a storage controlling device including a memory and a processor configured to obtain information on each of a plurality of remaining lives of each of a plurality of storage devices included in a redundancy storage system, determine each of a plurality of timings for replacement of each of the plurality of storage devices so that a number of the timings for replacement included in a predetermined time range is less than a predetermined number, each of a plurality of timings for replacement being determined to be earlier than each of the plurality of timings that malfunctions occur in each of the plurality of storage devices corresponding to each of a plurality of timings for replacement, each of the plurality of timings that malfunctions occur being specified based on the obtained information, and output information that indicates at least one of the plurality of determined timings for replacement.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an example table illustrating an update of a time-of-change storage table;

FIG. 11 is an example table illustrating an update of a remaining life table;

FIG. 13 is an example table illustrating an update of an early replacement coefficient table;

FIG. 14 is an example table illustrating storage contents of the remaining life table before and after updating.

DESCRIPTION OF EMBODIMENT

In contrast, in the related art, a multi-dead state may occur in a case where the occurrence of a multi-dead state is predicted by using the SMART function and two or more storage devices which may cause a multi-dead state are replaced. Specifically, in a case where another storage device malfunctions while a storage device from two or more storage devices which may cause a multi-dead state is replaced, a multi-dead state occurs.

In one aspect, an object of the embodiment discussed here is to provide a storage controlling device, a storage controlling method, and a storage controlling program which are capable of deciding a sequence of replacing storage devices among two or more storage devices and restraining the occurrence of a multi-dead state.

Hereinafter, an embodiment of a storage controlling device, a storage controlling method, and a storage controlling program of the disclosure will be described in detail with reference to the accompanying drawings.

Figure 1:
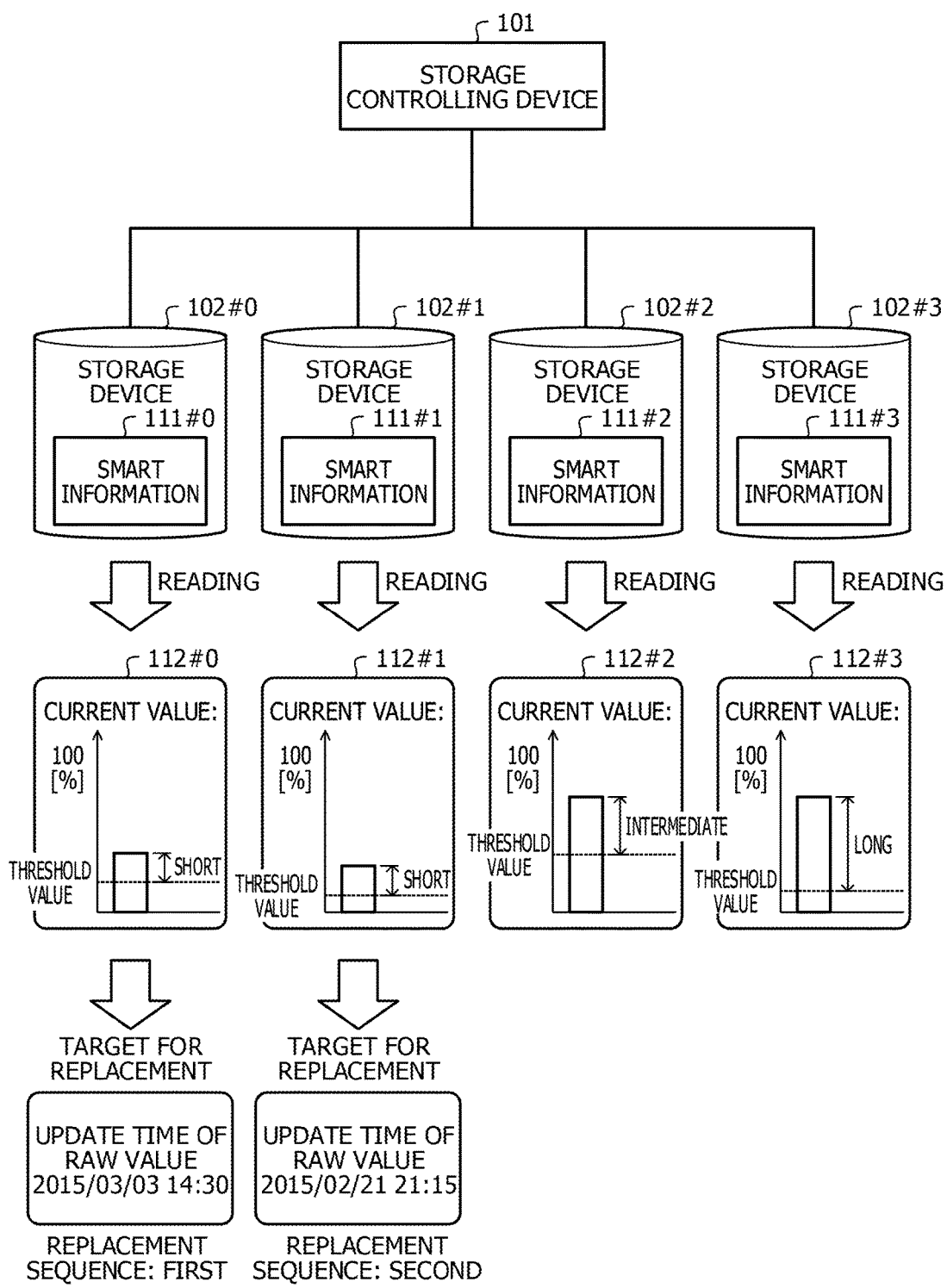
FIG. 1 is an example diagram illustrating the operation of a storage controlling device according to an embodiment.

FIG. 1 is an example diagram illustrating the operation of a storage controlling device 101 according to the embodiment. The storage controlling device 101 is a computer that controls multiple storage devices 102. The storage device is a data storage device. For example, the storage device 102 is a hard disk drive (HDD) or a solid state drive (SSD).

The storage controlling device 101 provides a virtual disk by combining together the multiple storage devices 102 via RAID technology. The storage controlling device 101 may be a device that realizes the RAID technology via hardware, or may be a device that realizes the RAID technology via software. There are RAID levels which represent methods of forming a virtual disk, as the RAID technology. In the embodiment, RAID levels higher than or equal to RAID 1 become targets. A level such as RAID 1+5, which is a combination of RAID levels, may become a target.

A virtual disk formed by RAID levels higher than or equal to RAID 1 has redundancy, and even if several storage devices malfunction, data can be recovered from other storage devices. Herein, the group of storage devices which form one virtual disk is referred to as a RAID group. For example, in a RAID 1 virtual disk that is formed from two storage devices contained in the same RAID group, even if either storage device of the two storage devices malfunctions, data can be recovered from the other storage device. In a RAID 5 virtual disk that is formed from three storage devices contained in the same RAID group, even if one storage device of the three storage devices malfunctions, data can be recovered from the remaining two storage devices. In a RAID 6 virtual disk that is formed from four storage devices contained in the same RAID group, even if two storage devices of the four storage devices malfunction, data can be recovered from the remaining two storage devices.

In contrast, in a case where two or more storage devices in RAID 1 and RAID 5 malfunction concurrently, or three or more storage devices in RAID 6 malfunction concurrently, that is, in a case where a multi-dead state occurs, data may not be recovered. The occurrence probability of a multi-dead state differs depending on an operation start time, a degradation rate, or a RAID configuration, and in a case where a multi-dead state occurs, data may not be recovered.

For example, as a method of restraining the occurrence of a multi-dead state, the occurrence of a multi-dead state being predicted by using a SMART function and prior to the occurrence of a multi-dead state, two or more storage devices which may cause a multi-dead state being replaced may be considered. The SMART function is a malfunction prediction function for a storage device which predicts a malfunction caused by degradation over time. For example, in a case where a storage device having the SMART function receives a request for state information indicating the state of the storage device, the storage device transmits the state information to a requestor. Hereinafter, state information is referred to as "SMART information".

SMART information contains the number of reallocated separate regions among separate regions into which the storage region of a storage device is divided. A separate region is the minimum storage unit for a storage region. Hereinafter, a separate region is referred to as a "sector". In a HDD storage device, the size of a sector is 512 bytes or 4096 bytes. The reallocation is a process of assigning a reallocated sector instead of a bad sector that data may not be read from and written to.

In contrast, in a case where the occurrence of a multi-dead state is predicted by using the SMART function, and prior to the occurrence of a multi-dead state, two or more storage devices which may cause a multi-dead state are replaced, a multi-dead state may occur. For example, in a case where SMART errors are notified at the same time in SMART monitoring, there is a risk of the occurrence of a multi-dead state. For example, in a case where another storage device malfunctions while a storage device from two or more storage devices which may cause a multi-dead state is replaced, a multi-dead state occurs.

In the embodiment, a method of deciding a replacement sequence will be described in which storage devices are replaced in descending order starting from a storage device having a rapidly increased reallocated sectors count in a case where malfunctions of the two or more storage devices are determined from SMART information. The operation of the storage controlling device 101 will be described with reference to FIG. 1. The storage controlling device 101 controls multiple storage devices 102 as one RAID group that is formed of storage devices 102#0 to 102#3. The storage controlling device 101 forms a virtual disk from the storage devices 102#0 to 102#3 according to RAID 5. Each of the storage devices 102#0 to 102#3 has the SMART function. In the embodiment, in a case where each of the storage devices 102#0 to 102#3 has a function of transmitting state information separately from the SMART function, the function of transmitting state information may be used separately from the SMART function.

First, the storage controlling device 101 reads SMART information 111#0 to 111#3 from the storage devices 102#0 to 102#3. Subsequently, with reference to the read SMART information 111#0 to 111#3, the storage controlling device 101 determines whether there are two or more storage devices 102 which may cause the occurrence of a multi-dead state and become targets for replacement. For example, in a case where there are two or more storage devices having reallocated sectors counts (contained in the SMART information 111) equal to or greater than a predetermined threshold value, the storage controlling device 101 determines that there are two or more storage devices which have become targets for replacement.

With reference to information other than the reallocated sectors counts contained in the SMART information 111, the storage controlling device 101 may determine whether there are two or more storage devices which become targets for replacement. Specifically, the SMART information 111 contains a non-usage ratio indicating a ratio between a reallocatable sectors count and the maximum reallocatable sectors count of the storage device 102, and a threshold value for the non-usage ratio which corresponds to specifications of the storage device 102.

Hereinafter, the non-usage ratio is referred to a current value of a reallocated sectors count referred to in the SMART function, and is simply referred to as a "current value". Similarly, a reallocated sectors count is referred to as a raw value of a reallocated sectors count referred to in the SMART function, and hereinafter, is simply referred to as a "raw value". Hereinafter, a threshold value for a reallocated sectors count referred to in the SMART function is simply referred to as a "threshold value".

In FIG. 1, graphs 112#0 to 112#3 respectively illustrate relationships between current values and threshold values of the storage devices 102#0 to 102#3, which are obtained from the SMART information 111#0 to 111#3. The length of a bar in each of the graphs 112#0 to 112#3 represents the magnitude of a current value. As illustrated in FIG. 1, the threshold values of the storage devices 102#0 to 102#3 are values which correspond to the specifications of the storage device 102. Since threshold values can be independently set by manufacturers of the storage devices 102, the threshold values are not the same.

The storage controlling device 101 determines whether there are two or more storage devices 102 which become targets for replacement, based on values which are respectively equal to the current values minus the corresponding threshold values. A value, which is equal to a current value minus a threshold value, is defined as a "remaining life". For example, in a case where the remaining lives of two or more storage devices 102 are less than or equal to a predetermined value of 5%, the storage controlling device 101 determines that there are two or more storage devices 102 which have become targets for replacement.

In the example illustrated in FIG. 1, for simple description, remaining lives in the graphs 112#0 to 112#3 are illustrated by three levels such as a "long period", an "intermediate period", and a "short period". A more detailed example of a remaining life is illustrated in FIG. 11. In the example illustrated in FIG. 1, the remaining lives of the storage devices 102#0 and 102#1 are "short", the remaining life of the storage device 102#2 is "intermediate", and the remaining life of the storage device 102#3 is "long". Accordingly, the storage controlling device 101 determines the storage devices 102#0 and 102#1 having a "short" remaining life as targets for replacement, and determines that there are two or more storage devices which have become targets for replacement.

Figure 15:
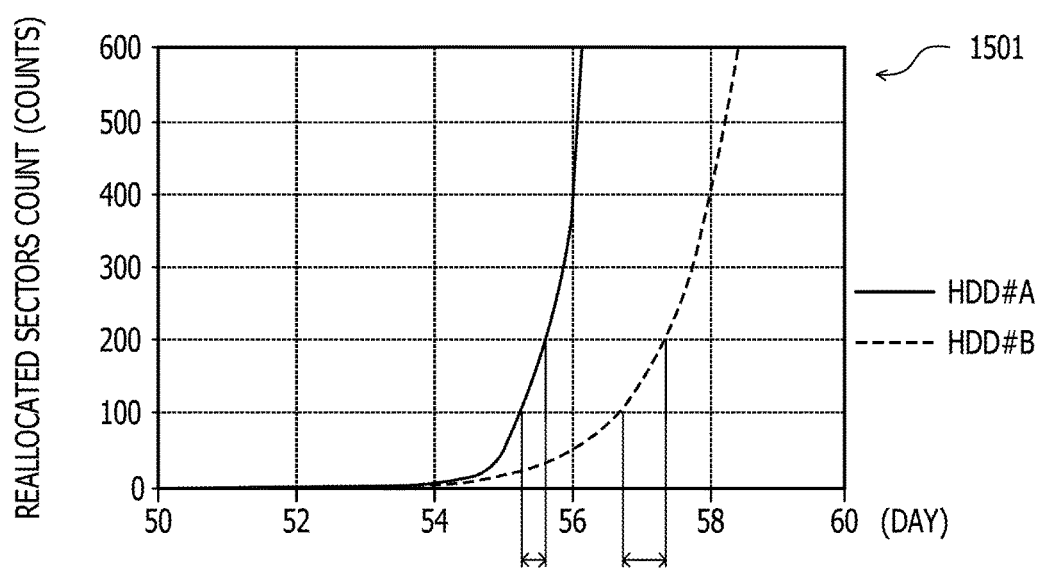
FIG. 15 is an example graph illustrating change over time in a reallocated sectors count.

Subsequently, in a case where it is determined that there are two or more storage devices, the storage controlling device 101 decides a sequence of replacing the two or more storage devices 102 based on change over time in raw values (contained in the SMART information 111 of the two or more storage devices 102). The reason the replacement sequence is determined based on the change over time in the raw values is that in a case where a raw value of a storage device has increased rapidly, the storage device is highly likely to malfunction soon. An example of change over time in a reallocated sectors count is illustrated in FIG. 15. For example, the storage controlling device 101 decides a sequence of replacing two or more storage devices 102 such that the two or more storage devices 102 are replaced in descending order starting from a storage device 102 in which a raw value has recently changed greatly in near time.

In the example illustrated in FIG. 1, the storage controlling device 101 decides a sequence of replacing two or more storage devices 102 such that the two or more storage devices 102 are replaced in ascending order starting from a storage device 102 in which a raw value has been most recently updated. In the example illustrated in FIG. 1, an update time of a raw value in the storage device 102#0 is 14:30 on 03/03/2015, and an update time of a raw value in the storage device 102#1 is 21:15 on 02/21/2015. Accordingly, the storage controlling device 101 decides the storage device 102#0 in which a raw value has been most recently updated as a first target for replacement, and decides the storage device 102#1 as a second target for replacement. As a result, a manager of the storage device 102 preferentially replaces the storage device 102#0 which is highly likely to malfunction soon, and the storage controlling device 101 is capable of restraining the occurrence of a multi-dead state. Hereinafter, an example of application of the storage controlling device 101 to a RAID card will be described with reference to FIG. 2.

Figure 2:
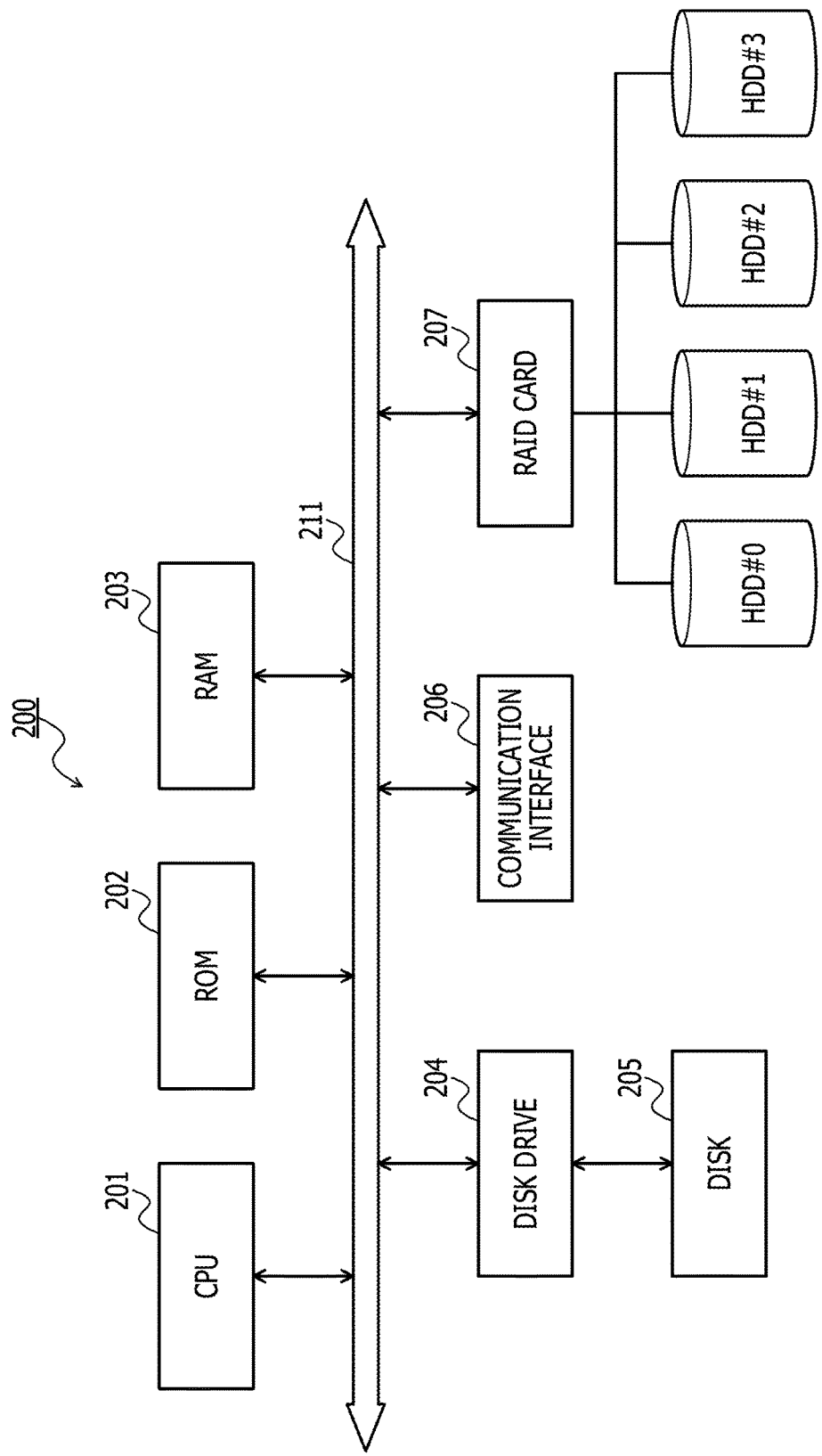
FIG. 2 is an example diagram illustrating the configuration of a RAID system.

FIG. 2 is an example diagram illustrating the configuration of a RAID system 200. In FIG. 2, the RAID system 200 includes a central processing unit (CPU) 201; a read-only memory (ROM) 202; and a random access memory (RAM) 203. The RAID system 200 includes a disk drive 204; a disk 205; a communication interface 206; a RAID card 207; and HDDs #0 to #3. The CPU 201, the ROM 202, the RAM 203, the disk drive 204, the communication interface 206, and the RAID card 207 are connected to each other via a bus 211. The RAID card 207 is equivalent to the storage controlling device 101 illustrated in FIG. 1. The HDDs #0 to #3 are equivalent to the storage device 102 illustrated in FIG. 1.

The RAID system 200 is a server, a personal computer, or the like. For example, in a case where the RAID system 200 is a server, the RAID system 200 provides a virtual disk, which is formed from the HDDs #0 to #3, to a user of the RAID system 200.

The CPU 201 is a computational processing unit that controls the entire RAID system 200. The RAID system 200 may include multiple CPUs. The ROM 202 is a non-volatile memory that stores programs such as a boot program. The RAM 203 is a volatile memory that is used as a working area of the CPU 201.

The disk drive 204 is a control device that controls data reading and data writing with respect to the disk 205 according to control of the CPU 201. A magnetic disk drive, an optical disc drive, a solid state drive, or the like can be adopted as the disk drive 204. The disk 205 is a non-volatile memory that stores data written through control of the disk drive 204. For example, in a case where the disk drive 204 is a magnetic disk drive, a magnetic disk can be adopted as the disk 205. In a case where the disk drive 204 is an optical disc drive, an optical disc can be adopted as the disk 205. In a case where the disk drive 204 is a solid state drive, a semiconductor memory formed of semiconductor elements, a so-called semiconductor disk can be adopted as the disk 205.

The communication interface 206 is a control device that manages an interface between a network and the inside of the RAID system 200 and controls data input to and data output from other apparatuses. Specifically, the communication interface 206 is connected to other apparatuses via a network through a communication line. A modem, a local area network (LAN) adaptor, or the like can be adopted as the communication interface 206.

The RAID card 207 is a device that realizes RAID technology via hardware. Specifically, the RAID card 207 forms a virtual disk from the HDDs #0 to #3. The RAID card 207 calculates parity. The functional configuration of the RAID card 207 will be described with reference to FIG. 3. In a case where a manager of the RAID system 200 directly operates the RAID system 200, the RAID system 200 may include hardware such as a display, a keyboard, and a mouse.

Figure 3:
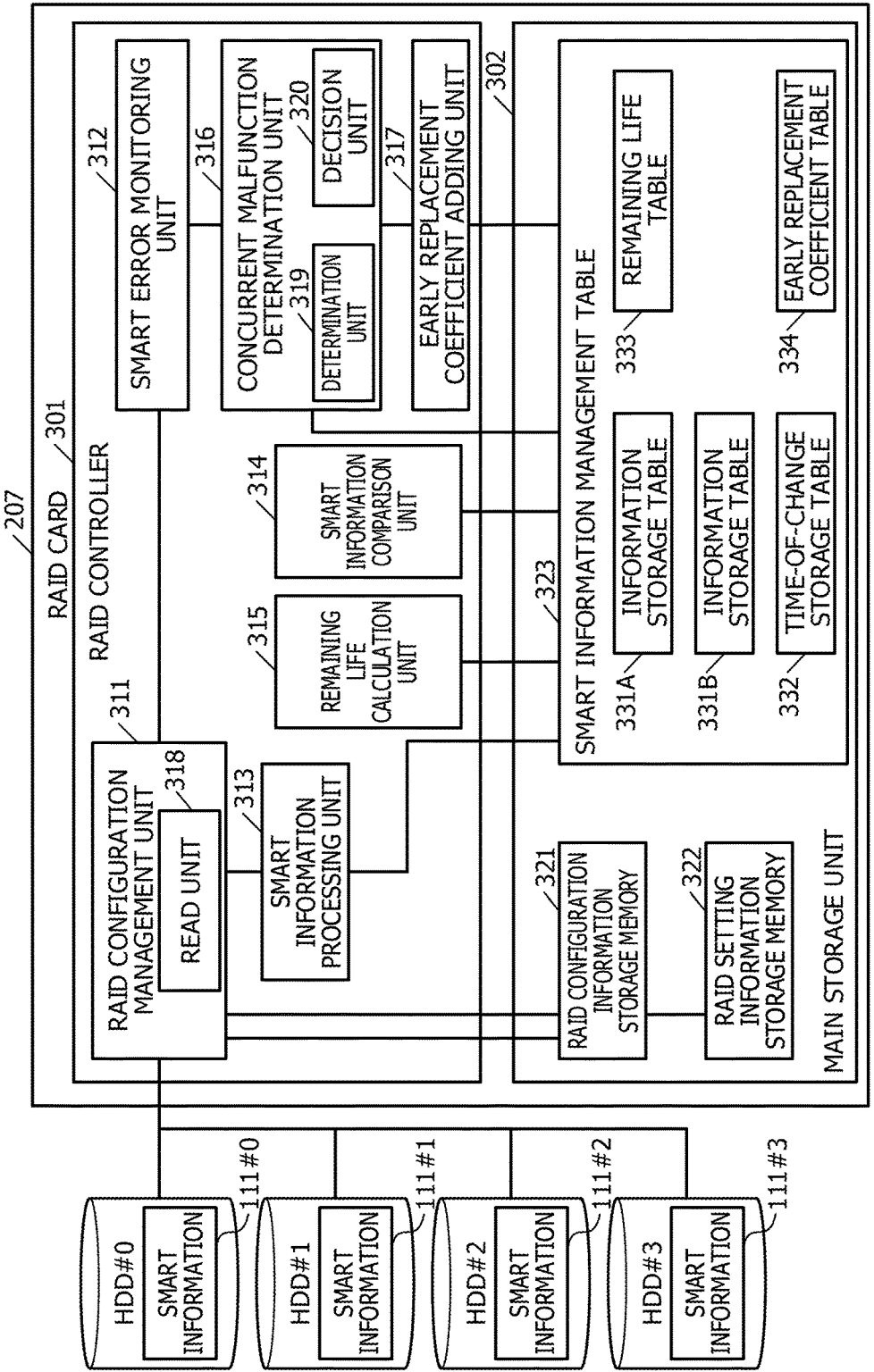
FIG. 3 is an example diagram illustrating the functional configuration of a RAID card.

FIG. 3 is an example diagram illustrating the functional configuration of the RAID card 207. The RAID card 207 includes a RAID controller 301 and a main storage unit 302. The RAID controller 301 controls the RAID card 207. The RAID controller 301 includes a RAID configuration management unit 311; a SMART error monitoring unit 312; a SMART information processing unit 313; a SMART information comparison unit 314; a remaining life calculation unit 315; a concurrent malfunction determination unit 316; and an early replacement coefficient adding unit 317. The RAID configuration management unit 311 includes a read unit 318. The concurrent malfunction determination unit 316 includes determination unit 319 and a decision unit 320.

The main storage unit 302 includes a RAID configuration information storage memory 321; a RAID setting information storage memory 322; and a SMART information management table 323. The SMART information management table 323 includes information storage tables 331A and 331B; a time-of-change storage table 332; a remaining life table 333; and an early replacement coefficient table 334.

The RAID configuration management unit 311 manages the RAID configuration and basic control of the HDDs #0 to #3. The SMART error monitoring unit 312 periodically monitors whether a SMART error has occurred in the HDDs #0 to #3, via the RAID configuration management unit 311.

The SMART information processing unit 313 periodically alternately stores a portion of SMART information and threshold values for a portion of the SMART information 111, which are used to predict a malfunction of the HDDs #0 to #3, in the information storage tables 331A and 3316. When either of the information storage table 331A or 331B is updated, the SMART information comparison unit 314 compares the information storage table 331A with the information storage table 331B, and updates and stores a difference which is obtained from the comparison, and a time when a difference is detected in the time-of-change storage table 332.

With reference to a table which stores current information between the information storage tables 331A and 331B, the remaining life calculation unit 315 calculates remaining lives such that even if the HDDs #0 to #3 have different specifications, reference values for monitoring a malfunction are normalized, and the remaining life calculation unit 315 stores the calculated remaining lives in the remaining life table 333.

In a case where there are two or more HDDs having remaining lives less than a predetermined value of 5%, the concurrent malfunction determination unit 316 determines whether these HDDs have malfunctioned concurrently by checking whether these HDDs are included in the same RAID configuration, and comparing the remaining lives with the remaining life table 333.

In a case where the concurrent malfunction determination unit 316 determines malfunctions as being concurrent, the early replacement coefficient adding unit 317 obtains an early replacement coefficient which is used to update the remaining life table 333 such that the concurrence of malfunctions is avoided. Specifically, for example, the early replacement coefficient adding unit 317 adds a predetermined value of −2% to an early replacement coefficient of any HDD that is preferentially replaced.

The read unit 318 reads the SMART information 111#0 to 111#3 from the HDDs #0 to #3. With reference to the SMART information 111#0 to 111#3 read by the read unit 318, the determination unit 319 determines whether there are two or more HDDs which become targets for replacement among the HDDs #0 to #3. Specifically, for example, in a case where there are two or more HDDs having remaining lives (can be calculated from the SMART information 111#0 to 111#3 read by the read unit 318) equal to or less than 5%, the determination unit 319 determines that there are two or more HDDs. Alternatively, in a case where there are two or more HDDs having raw values (contained in the SMART information 111#0 to 111#3 read by the read unit 318) equal to or greater than a predetermined value, the determination unit 319 may determine that there are two or more HDDs.

The SMART information 111 is assumed to contain reallocatable sectors counts, and threshold values for the reallocatable sectors counts which correspond to specifications of the HDDs. In a case where there are two or more HDDs having reallocatable sectors counts (contained in the SMART information 111 read by the read unit 318) equal to or greater than the threshold value therefor, the determination unit 319 may determine that there are two or more HDDs. The determination unit 319 may obtain current values from the reallocatable sectors counts, and obtain threshold values for the current values from the threshold values for the reallocatable sectors counts. The determination unit 319 calculates remaining lives by subtracting the threshold value from the obtained current values. For example, in a case where there are two or more HDDs having calculated remaining lives equal to or less than 5%, the determination unit 319 may determine that there are two or more HDDs.

In a case where a difference between the remaining lives is less than or equal to a value obtained by dividing a predetermined length of time taken to replace any HDD by an average value of time intervals between the occurrences of reallocation in the HDDs and the maximum reallocatable sectors count, the determination unit 319 determines that there are two or more HDDs which have become targets for replacement. For example, a predetermined length of time taken to replace any HDD is assumed to be 20 hours. An average value of time intervals between the occurrences of reallocation in the HDDs is assumed to be one hour. The maximum reallocatable sectors count is assumed to be 2000. In a case where a difference between remaining lives is equal to or less than 20/1/2000=0.01=1%, the determination unit 319 determines that there are two or more HDDs which have become targets for replacement. The predetermined length of time taken to replace any HDD or the average value of time intervals between the occurrences of reallocation in the HDDs is set by the manager of the HDDs #0 to #3. The RAID card 207 may obtain the average value of time intervals between the occurrences of reallocation in the HDDs with reference to the information storage table 331, the time-of-change storage table 332, or the like.

In the following description, in a case where the difference between remaining lives is 1% or less, "the remaining lives are considered to be equal".

The SMART information 111 is assumed to contain reallocatable sectors counts, and threshold values for the reallocatable sectors counts which correspond to the specifications of the HDDs. In a case where a difference between the values, which are respectively equal to the reallocatable sectors counts minus the threshold values, is less than or equal to a value obtained by dividing the predetermined length of time, which is taken to replace any HDD, by the average value of time intervals between the occurrences of reallocation in the HDDs, the determination unit 319 determines that there are two or more HDDs which have become targets for replacement.

In a case where the determination unit 319 determines that there are two or more HDDs which have become targets for replacement, the decision unit 320 decides a sequence of replacing the two or more HDDs which become targets for replacement, based on change over time in raw values (contained in the SMART information 111). For example, the decision unit 320 decides a sequence of replacing the two or more HDDs such that the two or more HDDs are replaced in ascending order starting from any HDD in which a raw value has been most recently changed in near time. Alternatively, the decision unit 320 may decide a sequence of replacing the two or more HDDs such that any HDD in which a raw value has been earliest changed in near time is replaced later.

The decision unit 320 may flexibly decide a sequence of replacing the two or more HDDs which become targets for replacement. For example, the determination unit 319 is assumed to determine that there are two or more HDDs, for example, the HDDs #0, #1, and #3, which have become targets for replacement. The HDD #0 is assumed to be a HDD in which a raw value has been most recently updated, and the HDDs #1 and #3 are assumed to be HDDs in which raw values have been updated earlier than the HDD #0, and have been updated at substantially the same time. In this case, the decision unit 320 may decide the replacement sequence such that the HDD #0 is replaced first, the HDD #1 is replaced second or third, and the HDD #3 is replaced second or third.

Among the two or more HDDs, the decision unit 320 specifies any HDD in which a raw value has been most recently changed. The decision unit 320 may decide a sequence of replacing the two or more HDDs based on a magnitude relationship between a value, which is equal to a current value minus a value greater than a threshold value in the specified HDD, and values which are respectively equal to current values minus threshold values in the remaining HDDs other than the specified HDD. A value greater than the threshold value is a value which is equal to the threshold value plus the predetermined value described in the description of the early replacement coefficient adding unit 317. In other words, the decision unit 320 decides the sequence of replacing the two or more HDDs based on a magnitude relationship between a value, which is equal to the remaining life of the specified HDD plus the predetermined value added by the early replacement coefficient adding unit 317, and remaining lives of the remaining HDDs other than the specified HDD.

The SMART information 111 is assumed to contain reallocatable sectors counts and threshold values for the reallocatable sectors counts which correspond to the specifications of the HDDs. The determination unit 319 is assumed to determine that there are two or more HDDs which have become targets for replacement. In this case, the decision unit 320 decides a sequence of the two or more HDDs which become targets for replacement, based on change over time in the reallocatable sectors counts.

The decision unit 320 notifies the CPU 201 of the decided replacement sequence. The CPU 201 outputs the decided replacement sequence to a display, a printer, or the like on which the manager of the HDDs #0 to #3 can read the determined replacement sequence.

The RAID configuration information storage memory 321 is a memory that stores RAID configuration information. The RAID setting information storage memory 322 is a memory that stores RAID settings. The information storage tables 331A and 331B are tables that store a portion of the SMART information 111 #0 to #3 which is used to predict a malfunction of the HDDs #0 to #3; the threshold values for a portion of the SMART information 111 #0 to #3; and update times. The time-of-change storage table 332 is a table that stores a time when a difference is detected for each HDD which are results of comparison between the information storage tables 331A and 331B. The remaining life table 333 is a table that stores the remaining life of each HDD which is calculated such that even if the HDDs #0 to #3 have different specifications, the reference values for monitoring a malfunction are normalized. The early replacement coefficient table 334 is a table that stores an early replacement coefficient of each HDD which is used to update the remaining life table 333. An initial value of the early replacement coefficient is zero. Hereinafter, an example operation in the functional configuration will be described with reference to FIGS. 4 to 6.

Figure 4:
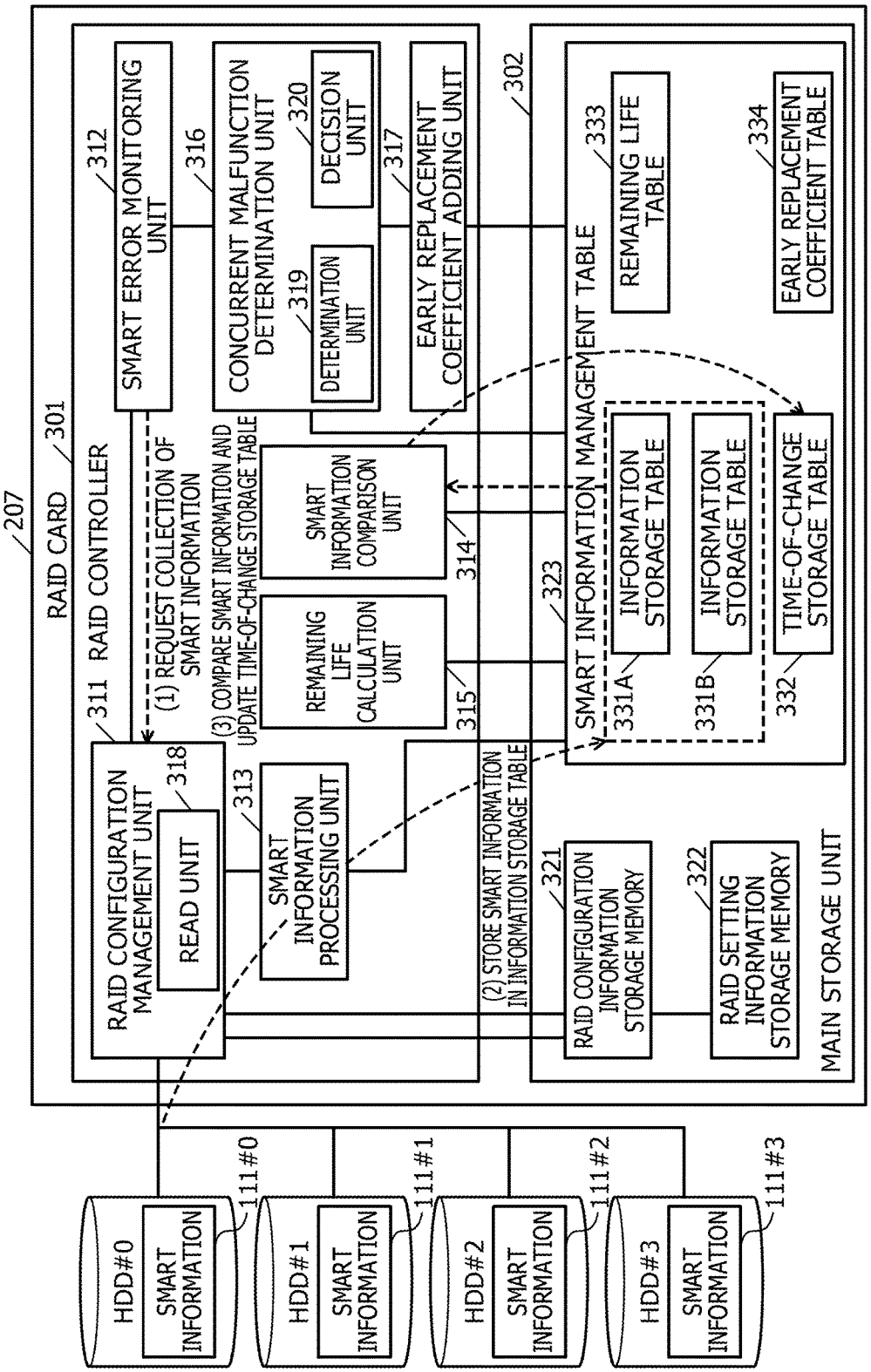
FIG. 4 is a diagram (Diagram 1) illustrating an example operation in the functional configuration.

FIG. 4 is a diagram (Diagram 1) illustrating an example operation in the functional configuration. The SMART error monitoring unit 312 monitors an error based on SMART notified by each HDD. As illustrated in step (1) in FIG. 4, the SMART error monitoring unit 312 periodically requests the SMART information processing unit 313 to collect the SMART information 111 regarding each HDD and a threshold value for the SMART information 111. As illustrated in step (2) in FIG. 4, the SMART information processing unit 313 which has received a request alternately stores current SMART information 111 and the previous SMART information 111 regarding each HDD in the information storage tables 331A and 331B of the SMART information management table 323. As illustrated in step (3) in FIG. 4, the SMART information comparison unit 314 compares the information storage table 331A with the information storage table 331B when either of the information storage table 331A or 331B is updated. In a case where a difference is detected, the SMART information comparison unit 314 stores a time when a difference is detected in the time-of-change storage table 332.

Figure 5:
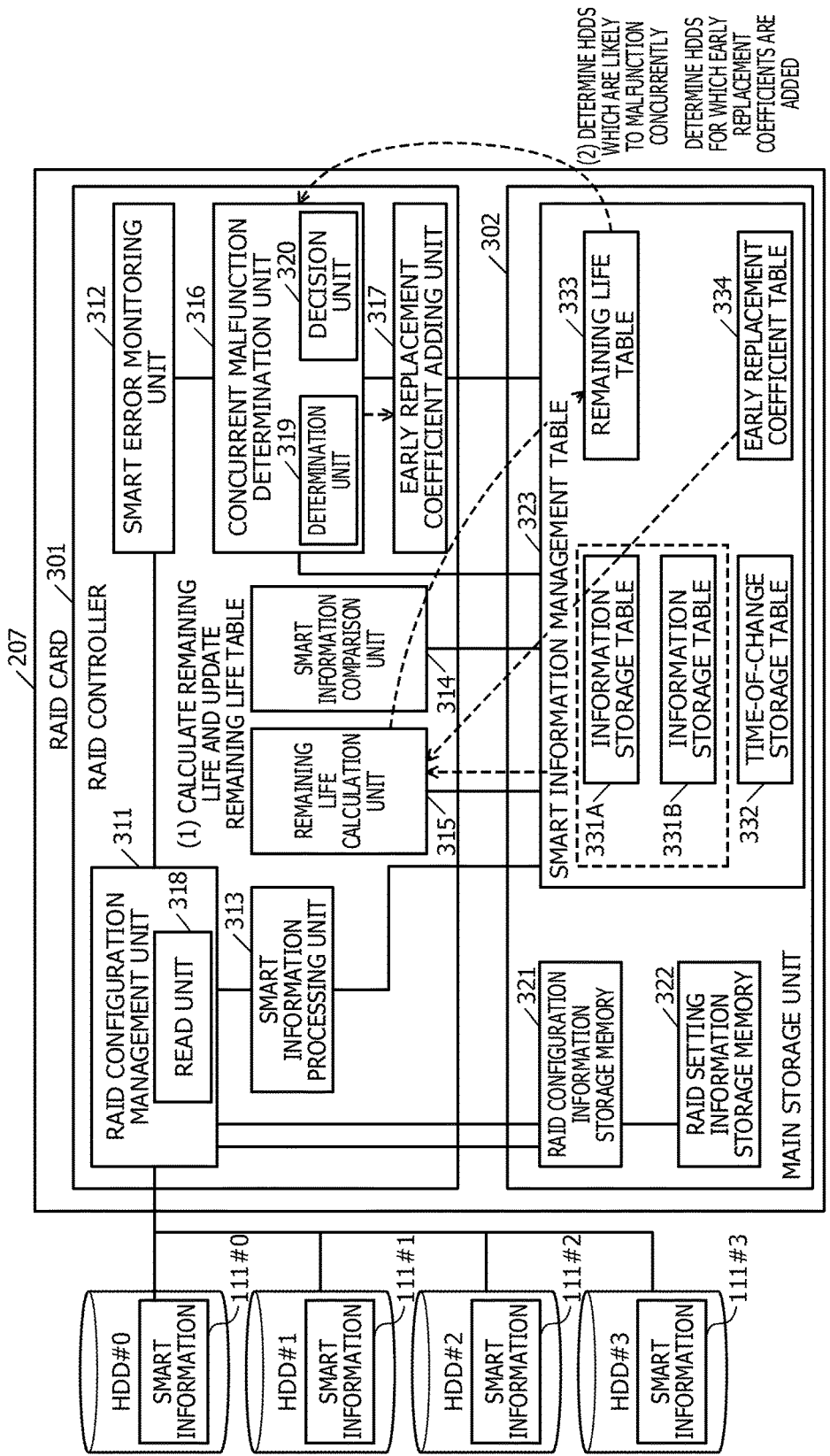
FIG. 5 is a diagram (Diagram 2) illustrating an example operation in the functional configuration.

FIG. 5 is a diagram (Diagram 2) illustrating an example operation in the functional configuration. After step (3) in FIG. 4 is complete, as illustrated in step (1) in FIG. 5, the remaining life calculation unit 315 calculates remaining lives based on the current SMART information 111 from one of the information storage tables 331A and 331B, and the early replacement coefficient table 334. Due to step (1) in FIG. 5, the RAID card 207 is capable of normalizing the reference values for monitoring a malfunction even if the HDDs have different specifications. The remaining life calculation unit 315 updates the remaining life table 333 with remaining lives which are respectively equal to the calculated remaining lives plus the predetermined value added by the early replacement coefficient adding unit 317. In an initial state of each HDD, a value of zero is added to the remaining life table 333 by the early replacement coefficient adding unit 317. A value less than zero is added over time so as to avoid the concurrence of malfunctions.

Subsequently, as illustrated in step (2) in FIG. 5, the concurrent malfunction determination unit 316 determines that two or more HDDs are likely to malfunction concurrently. In a case where the concurrent malfunction determination unit 316 decides malfunctions as being concurrent, the concurrent malfunction determination unit 316 determines HDDs for which the early replacement coefficient is added by the early replacement coefficient adding unit 317 so as to avoid the concurrence of malfunctions. For example, the concurrent malfunction determination unit 316 may add a predetermined value for HDDs in which malfunctions will occur soonest, based on a change in a malfunction time transition in the SMART information 111 of the time-of-change storage table 332.

Figure 6:
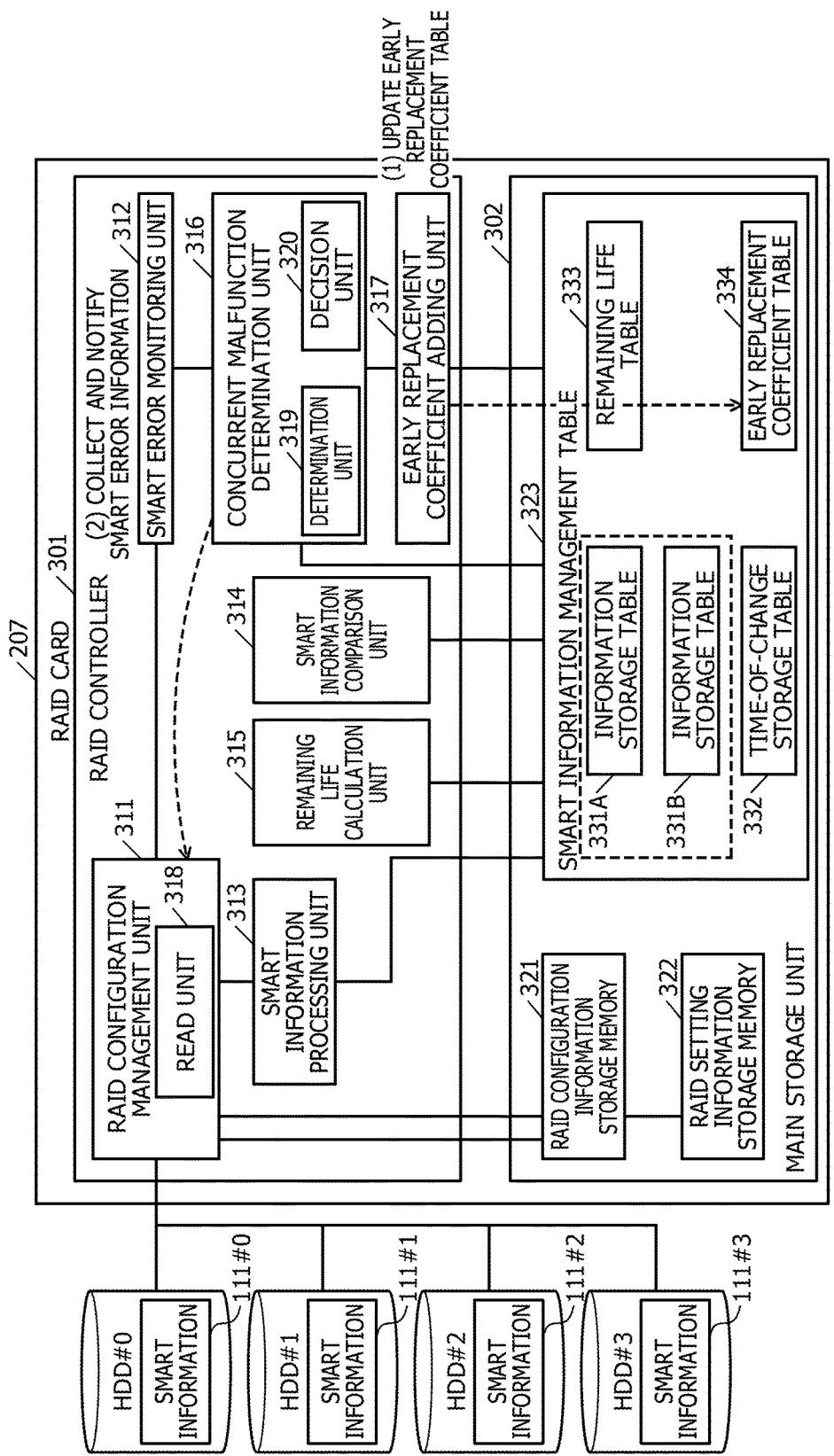
FIG. 6 is a diagram (Diagram 3) illustrating an example operation in the functional configuration.

FIG. 6 is a diagram (Diagram 3) illustrating an example operation in the functional configuration. After step (2) in FIG. 5 is complete, as illustrated in step (1) in FIG. 6, the early replacement coefficient adding unit 317 updates the early replacement coefficient table 334. As illustrated in step (2) in FIG. 6, the SMART error monitoring unit 312 collects and notifies SMART error information to the CPU 201 and the like.

Figure 7:
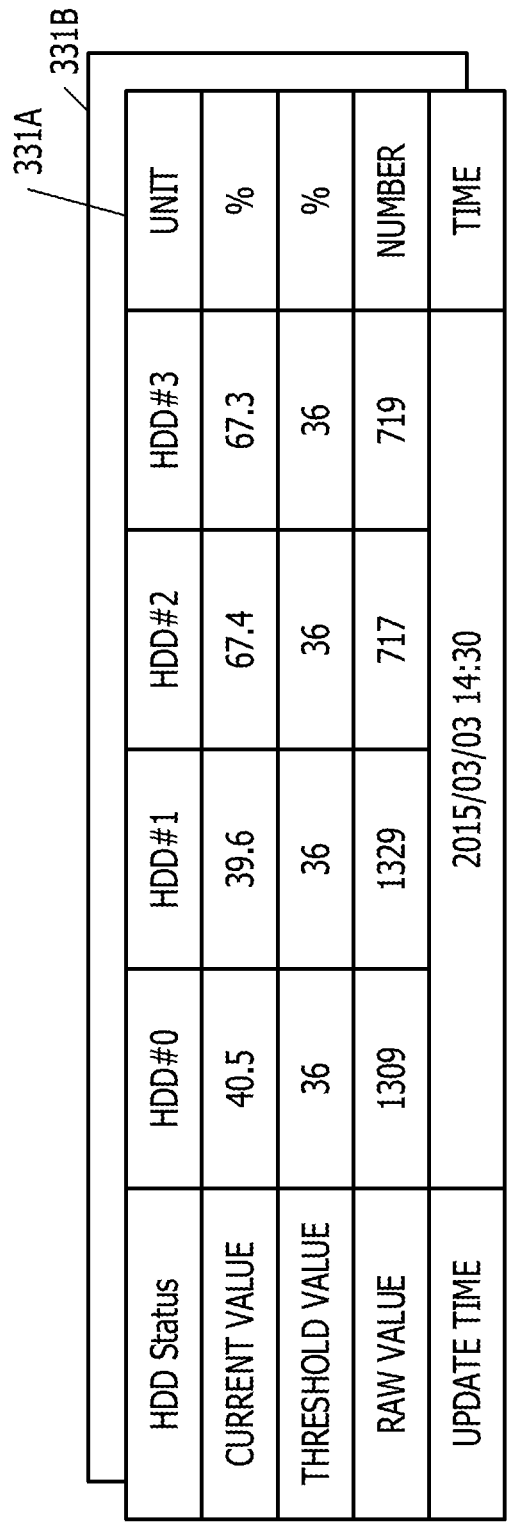
FIG. 7 is an example table illustrating storage contents of an information storage table.

FIG. 7 is an example table illustrating storage contents of the information storage table 331. Each of the information storage tables 331A and 331B illustrated in FIG. 7 stores a reallocated sectors count and an update time in the SMART information 111 regarding each HDD. The reallocated sectors count contains a current value, a threshold value, and a raw value.

As illustrated in FIG. 1, the current value represents a ratio between a reallocatable sectors count and the maximum reallocatable sectors count of each HDD. The current value decreases from 100% as each HDD is consumed.

The threshold value is a criterion for determination of whether a SMART error is to be notified, and is compared with the current value. According to specifications of a typical HDD, in a case where a current value is less than a threshold value, a SMART error of the HDD is notified. Accordingly, a remaining life, which is equal to a current value minus a threshold value, becomes important.

As illustrated in FIG. 1, the raw value represents a reallocated sectors count. Data may not be read from or written to a sector that has become a reallocation target and data has not been capable of being read from or written to. Accordingly, the raw value is equal to the number of reallocations. The raw value increases from zero as each HDD is consumed. For illustrative purpose, the raw values illustrated in FIG. 7 are expressed in decimal numbers.

For example, the information storage table 331A in FIG. 7 illustrates that the HDD #0 has a current value of 40.5%, a threshold value of 36%, and a raw value of 1309. The information storage table 331A in FIG. 7 illustrates that an update time of the reallocated sectors counts of the HDDs #0 to #3 is 14:30 on 03/03/2015. Hereinafter, a flowchart regarding a monitoring process will be described with reference to FIG. 8.

Figure 8:
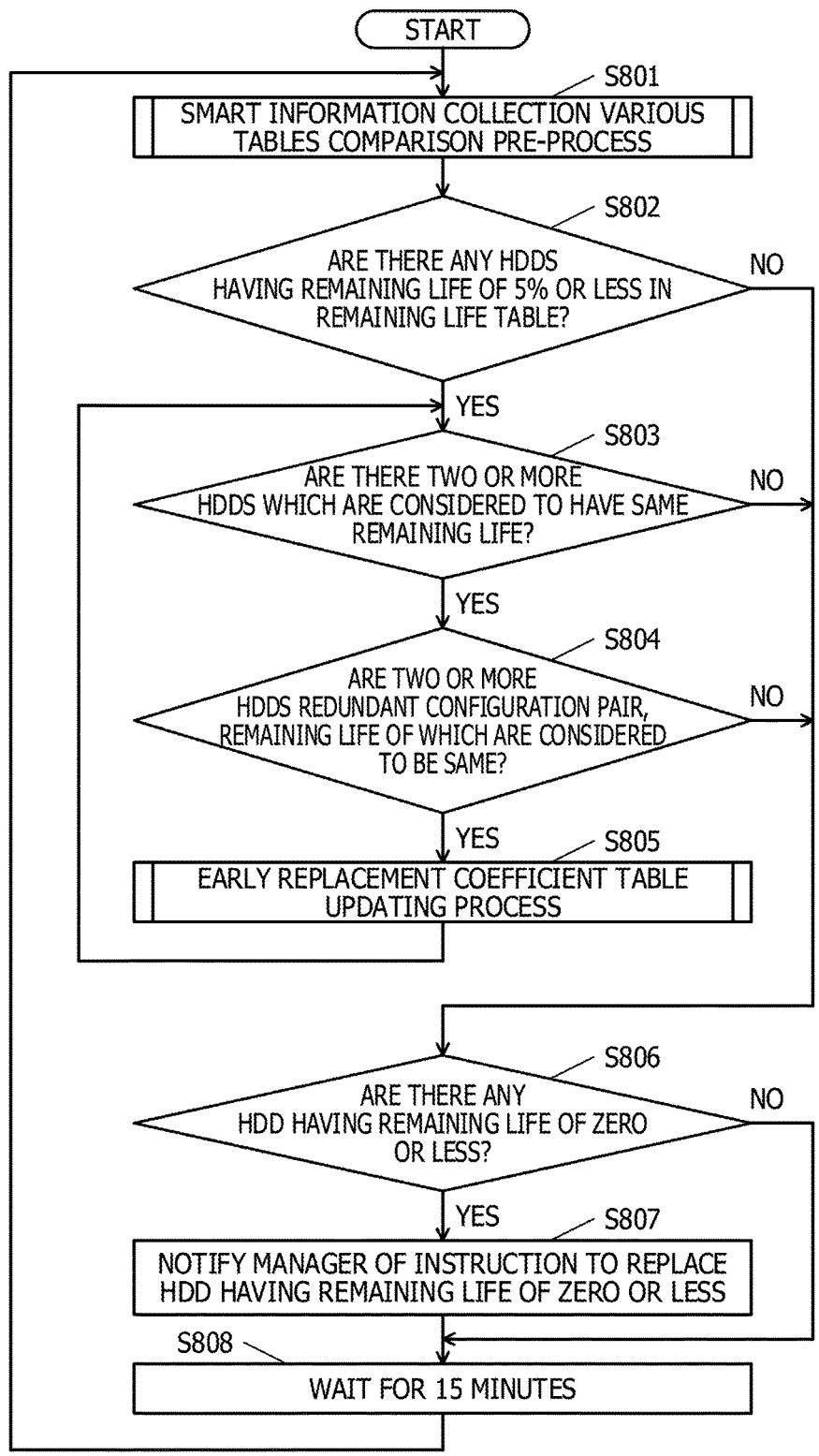
FIG. 8 is an example flowchart illustrating the sequence of a monitoring process.

FIG. 8 is an example flowchart illustrating the sequence of the monitoring process. The monitoring process is a process that is continuously performed after a RAID operation is started. Portions of the RAID card 207 collaboratively execute the monitoring process.

The RAID card 207 executes a SMART information collection various tables comparison pre-process (Step S801). The SMART information collection various tables comparison pre-process will be described with reference to FIG. 9. After Step S801 is complete, the concurrent malfunction determination unit 316 determines whether there are any HDDs having a remaining life of 5% or less in the remaining life table 333 (Step S802). In a case where there are any HDDs having a remaining life of 5% or less (Step S802: Yes), the concurrent malfunction determination unit 316 determines whether there are two or more HDDs, the remaining lives of which are considered to be the same (Step S803). In a case where there are two or more HDDs, the remaining lives of which are considered to be the same (Step S803: Yes), the concurrent malfunction determination unit 316 determines whether the two or more HDDs, the remaining lives of which are considered to be the same, that are a redundant configuration pair (Step S804).

In a case where there are two or more HDDs, the remaining lives of which are considered to be the same, that are a redundant configuration pair (Step S804: Yes), the early replacement coefficient adding unit 317 executes an early replacement coefficient table updating process (Step S805). The early replacement coefficient table updating process will be described with reference to FIG. 12. The RAID card 207 proceeds to Step S803.

In contrast, in a case where there are no HDDs having a remaining life of 5% or less (Step S802: No), the SMART error monitoring unit 312 determines whether there are any HDDs having a remaining life of zero or less (Step S806). In a case where there is one HDD, the remaining life of which is considered to be the same, or in a case where there are two or more HDDs, the remaining lives of which are considered to be the same, that are not a redundant configuration pair (Steps S803 and S804: No), the SMART error monitoring unit 312 executes Step S806.

In a case where there are any HDD having a remaining life of zero or less (Step S806: Yes), the SMART error monitoring unit 312 notifies the manager of the HDDs #0 to #3 of an instruction to replace the HDD having a remaining life of zero or less (Step S807). After Step S807 is ended, or in a case where there are no HDDs having a remaining life of zero or less (Step S806: No), the RAID card 207 waits for an interval time of 15 minutes (Step S808). The RAID card 207 proceeds to Step S801. A waiting time of 15 minutes in Step S808 is the length of time with a margin that is set based on conditions in which a reallocated sectors count is changed approximately every one hour at the shortest.

Figure 9:
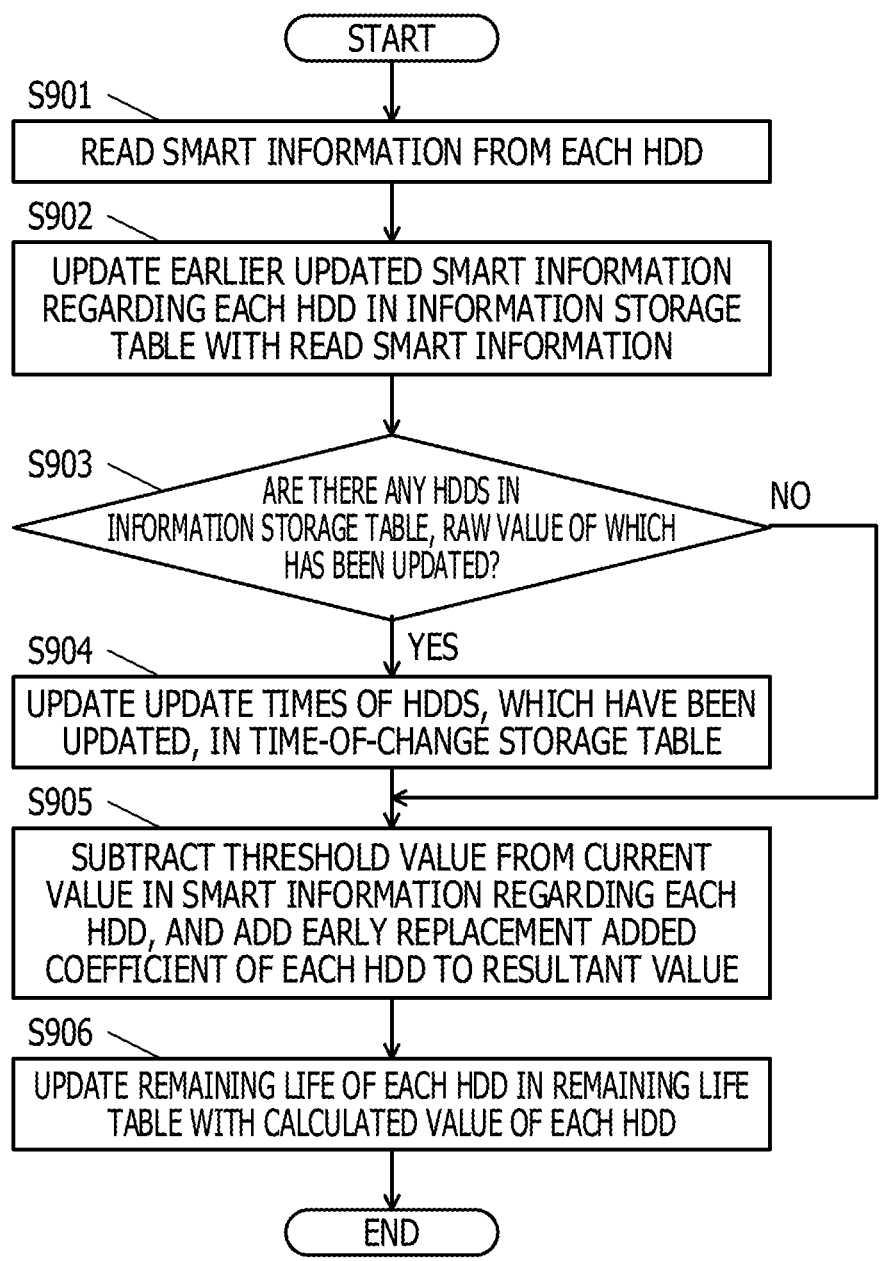
FIG. 9 is an example flowchart illustrating the sequence of a SMART information collection various tables comparison pre-process.

FIG. 9 is an example flowchart illustrating the sequence of the SMART information collection various tables comparison pre-process. The SMART information collection various tables comparison pre-process is a process of updating various tables such as the information storage table 331, the time-of-change storage table 332, and the remaining life table 333 prior to comparison of SMART information.

The SMART information processing unit 313 reads the SMART information 111 from each HDD (Step S901). Subsequently, the SMART information processing unit 313 updates one which has been updated earlier between the information storage tables 331A and 331B, that is, the earlier updated SMART information 111 regarding each HDD with the read SMART information 111 (Step S902). At this time, the SMART information processing unit 313 also updates an update time in the updated information storage table 331 with a current time. Subsequently, the SMART information comparison unit 314 determines whether there are any HDDs in the information storage table 331, the raw value of which has been updated (Step S903).

In a case where there are any HDDs in the information storage table 331, the raw value of which has been updated (Step S903: Yes), the SMART information comparison unit 314 updates update times of HDDs, which have been updated, in the time-of-change storage table 332 (Step S904). FIG. 10 illustrates a specific example of an update of the time-of-change storage table 332.

After Step S904 is complete, or in a case where there are no HDDs in the information storage table 331, the raw value of which has been updated (Step S903: No), the SMART information comparison unit 314 subtracts a threshold value from a current value in SMART information regarding each HDD, and adds an early replacement added coefficient of each HDD to the resultant value (Step S905). The remaining life calculation unit 315 updates the remaining life of each HDD in the remaining life table 333 with the calculated value of each HDD (Step S906). FIG. 11 illustrates a specific example of an update of the remaining life table 333. After Step S906 is complete, the RAID card 207 ends the SMART information collection various tables comparison pre-process.

FIG. 10 is an example table illustrating an update of the time-of-change storage table 332. FIG. 10 illustrates a raw value of each HDD in the updated information storage table 331A illustrated in FIG. 7, a raw value of each HDD in the information storage table 331B, and the time-of-change storage table 332.

In the example illustrated in FIG. 10, after the information storage table 331A is updated at 14:30 on 03/03/2015, the SMART information comparison unit 314 determines whether there are any HDDs in the information storage table 331, the raw value of which has been updated. In the example illustrated in FIG. 10, since the raw value of the HDD #0 has been updated, the SMART information comparison unit 314 updates the update time of the HDD #0 in the time-of-change storage table 332 with a character string "03/03/2015 14:30" indicating an update time of the information storage table 331A. In the example illustrated in FIG. 10, the updated spot is illustrated in a halftone pattern.

FIG. 11 is an example table illustrating an update of the remaining life table 333. FIG. 11 illustrates a current value and a threshold value of each HDD in the updated information storage table 331A illustrated in FIG. 7, the early replacement coefficient table 334, and the remaining life table 333. An early replacement coefficient of each HDD in the early replacement coefficient table 334 illustrated in FIG. 11 is assumed to be zero.

The remaining life calculation unit 315 subtracts the threshold value from the current value of each HDD, calculates a remaining life of each HDD by adding the early replacement coefficient to the value obtained from the subtraction, and updates the remaining life table 333 with the calculated remaining life. In the example illustrated in FIG. 11, the remaining life calculation unit 315 calculates a remaining life of 4.5 by subtracting a threshold value of 36 from a current value of 40.5 of the HDD #0, and adding an early replacement coefficient of zero to a value of 4.5 obtained from the subtraction.

Figure 12:
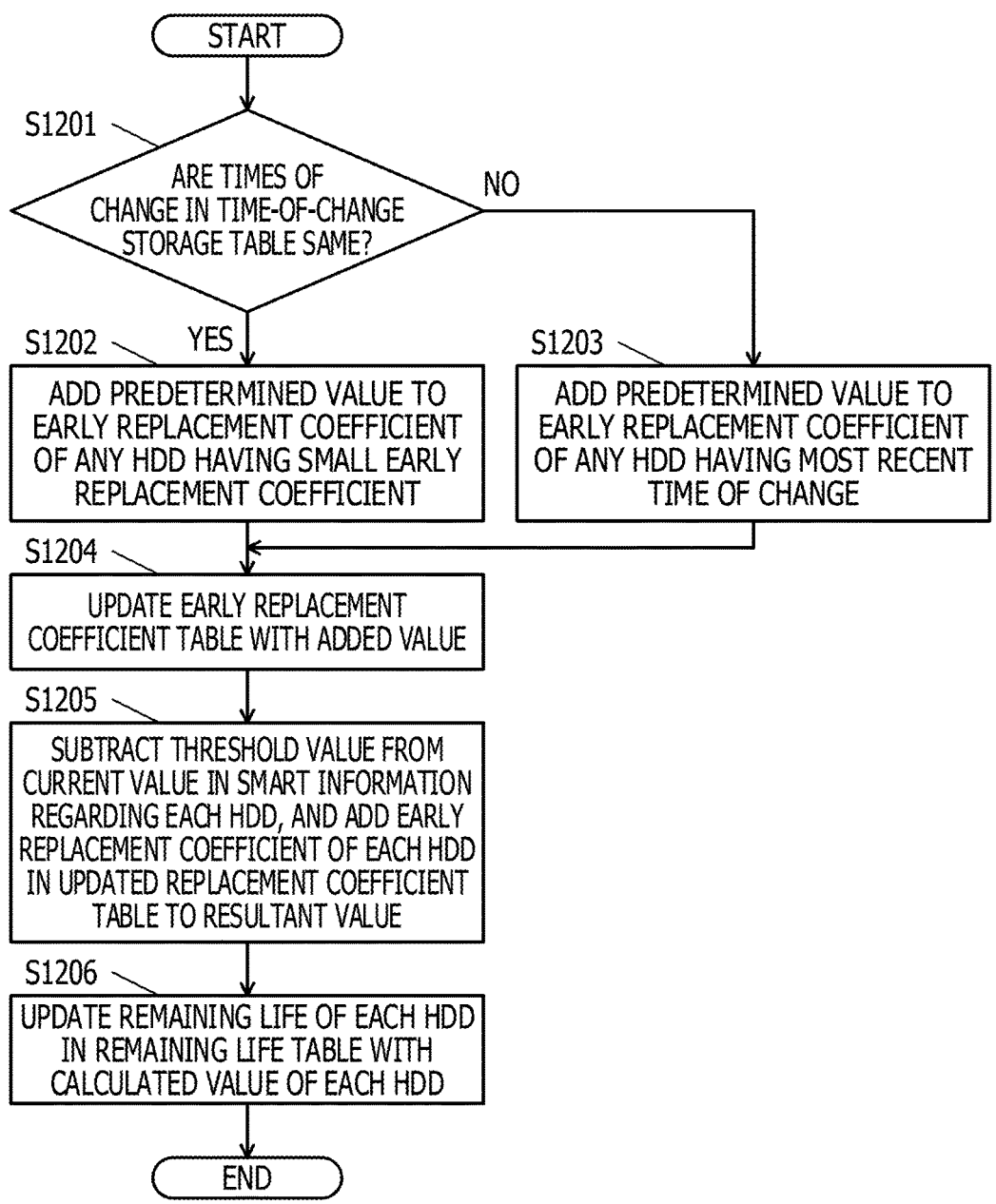
FIG. 12 is an example flowchart illustrating the sequence of an early replacement coefficient table updating process.

FIG. 12 is an example flowchart illustrating the sequence of an early replacement coefficient table updating process. The early replacement coefficient table updating process is a process of updating the early replacement coefficient table 334. The remaining lives of HDDs, which become targets for the early replacement coefficient table updating process, are assumed to be the same in Step S804. Two or more HDDs are assumed to become targets for the early replacement coefficient table updating process.

The early replacement coefficient adding unit 317 determines whether times of changes in the time-of-change storage table 332 are the same (Step S1201). In a case where times of changes in the time-of-change storage table 332 are the same (Step S1201: Yes), the early replacement coefficient adding unit 317 adds the predetermined value to the early replacement coefficient of any HDD having a small early replacement coefficient (Step S1202). In contrast, in a case where times of change in the time-of-change storage table 332 are not the same (Step S1201: No), the early replacement coefficient adding unit 317 adds the predetermined value to the early replacement coefficient of any HDD having the most recent time of change (Step S1203).

For example, the predetermined value in Steps S1202 and S1203 is −2%. A validity of −2% will be described. First, the small number of reserved sectors is approximately 2000 as a decimal number. Reallocation is considered to occur every one day or more in one sector in a typical case, and every one hour in one sector in a case where HDDs are very quickly consumed. In a case where consumption of HDDs is considerable, and a minimum difference of desirably approximately one day between the occurrence times of SMART errors is ensured, preferably, the remaining lives are determined to be the same at an error less than 1%, that is, at 2000×0.01×1 hours=approximately 20 hours, and an offset is added. A predetermined value of −2% is added to the early replacement coefficient such that the minimum difference of 40 hours between the occurrence times of SMART errors occurs. It is possible to reliably perform work prior to the occurrence of a multi-dead state by incorporating a margin of one day or more in operation and maintenance.

In a case where, in Step S802, a remaining life of 5% or less is set as a threshold value at which an early replacement coefficient is added, a maximum early replacement coefficient of −6% can be numerically applied; however, in this case, the values of remaining lives become negative, and thus, a maximum early replacement coefficient of −5% is actually added. In a case where one sector is assumed to be replaced per day, it can be said that a replacement time comes earlier 100 days. In a case where it is considered that a HDD quickly consumed is operated for at least approximately three to four years, the remaining life has a negligible level.

After Step S1202 or S1203 is complete, the early replacement coefficient adding unit 317 updates the early replacement coefficient table 334 with the added value (Step S1204). An example of an update of the early replacement coefficient table 334 will be described with reference to FIG. 13.

Subsequently, the early replacement coefficient adding unit 317 subtracts a threshold value from a current value in the SMART information 111 regarding each HDD, and adds the early replacement coefficient of each HDD in the updated early replacement coefficient table 334 to the resultant value (Step S1205). The early replacement coefficient adding unit 317 updates the remaining life of each HDD in the remaining life table 333 with the calculated value of each HDD (Step S1206). An example of an update of the remaining life table 333 will be described with reference to FIG. 14. After Step S1206 is complete, the RAID card 207 ends the early replacement coefficient table updating process.

FIG. 13 is an example table illustrating an update of the early replacement coefficient table 334. FIG. 13 illustrates the time-of-change storage table 332 illustrated in FIG. 10, and the early replacement coefficient table 334. In the example illustrated in FIG. 13, the early replacement coefficient adding unit 317 adds a predetermined value of −2% to the early replacement coefficient of the HDD #0 having the most recent time of change.

FIG. 14 is an example table illustrating storage contents of the remaining life table 333 before and after updating. FIG. 14 illustrates the remaining life table 333 before values of the early replacement coefficient table 334 are updated, the updated early replacement coefficient table 334 illustrated in FIG. 13, and a remaining life table 333' after the remaining life table 333 is updated with the values of the early replacement coefficient table 334.

In the example illustrated in FIG. 14, the early replacement coefficient adding unit 317 obtains 2.5 by subtracting a threshold value of 36 from a current value of 40.5 in the SMART information 111 regarding the HDD #0, and adding an early replacement coefficient of −2 of the HDD #0 in the updated early replacement coefficient table 334 to the resultant value. The obtained value is a value which is equal to a value in the remaining life table 333 before updating minus the value in the early replacement coefficient table 334. In the example illustrated in FIG. 14, since there are no HDDs having a remaining life of 0% or less, the SMART error monitoring unit 312 does not notify the manager of an instruction to replace any of the HDDs. Accordingly, it is possible to non-concurrently set replacement times of the HDDs #0 and #1 the lives of which come to an end concurrently.

A more complicated situation will be described in which in Step S803, there are three HDDs, the remaining lives of which are considered to be the same. First, in Step S803 of a first loop, the remaining life table 333 is assumed to have the following values. The time-of-change storage table 332 is assumed to have the same values as those illustrated in FIG. 10. In a stage prior to Step S803 in the first loop, the early replacement coefficient table 334 is assumed to have a value of zero.
HDD #0: 4.5
HDD #1: 3.6
HDD #2: 31.4
HDD #3: 4.0

In this case, the concurrent malfunction determination unit 316 determines that the remaining lives of the HDDs #0, #1, and #3 are considered to be the same. Accordingly, in Step S805 in which the early replacement coefficient table updating process is executed, the early replacement coefficient adding unit 317 adds a predetermined value of −2% to the early replacement coefficient of the HDD #0, the update time of which is the most recent among the HDDs #0, #1, and #3. The early replacement coefficient adding unit 317 updates the remaining life table 333 using the updated early replacement coefficient table 334 as follows.

HDD #0: 2.5
HDD #1: 3.6
HDD #2: 31.4
HDD #3: 4.0

After Step S805 is complete, in Step S803 of a second loop, the concurrent malfunction determination unit 316 determines that the remaining lives of the HDDs #1 and #3 are considered to be the same. In Step S805 in which the early replacement coefficient table updating process is executed, a predetermined value of −2% is added to the early replacement coefficient of the HDD #1, the update time of which is the most recent between the HDDs #1 and #3. The early replacement coefficient adding unit 317 updates the remaining life table 333 using the updated early replacement coefficient table 334 as follows.

HDD #0: 2.5
HDD #1: 1.6
HDD #2: 31.4
HDD #3: 4.0

After Step S805 is complete, in Step S803 of a third loop, the concurrent malfunction determination unit 316 determines that the remaining lives of the HDD #0 and #1 are considered to be the same. In Step S805 in which the early replacement coefficient table updating process is executed, a predetermined value of −2% is added to the early replacement coefficient of the HDD #0, the update time of which is the most recent between the HDDs #0 and #1. Accordingly, the early replacement coefficient of the HDD #0 becomes −4%. The early replacement coefficient adding unit 317 updates the remaining life table 333 using the updated early replacement coefficient table 334 as follows.

HDD #0: 0.5
HDD #1: 1.6
HDD #2: 31.4
HDD #3: 4.0

After Step S805 is complete, in Step S803 of a fourth loop, the concurrent malfunction determination unit 316 determines that there are no HDDs, the remaining lives of which are considered to the same. In this case, the RAID card 207 determines a replacement sequence such that the HDDs #0, #1, and #3 are replaced in this order from the shortest remaining life.

FIG. 15 is an example graph illustrating change over time in a reallocated sectors count. A rapid increase in reallocated sectors count becomes a distinct indicator for prediction of a malfunction. Reference Documents 1 and 2 below disclose examples in which systems are operated in a state where a reallocated sectors count has been rapidly increased.

(Reference Document 1: update of CDI—shyuukai okure no nikki [retrieved on Jun. 2, 2015], Internet <http://d.hatena.ne.jp/hinkyaku49/20131018/1382104290>)

(Reference Document 2: shirokuro nyanko kedamadan>>Blog Archive>>reallocated sectors count increasing:, [retrieved on Jun. 2, 2015], Internet <http://majimegawa.com/blog/nyanko/archives/1630>)

In FIG. 15, Graph 1501 schematically illustrates change over time in reallocation counts of HDDs #A and #B. The horizontal axis of Graph 1501 represents the number of days from start of use of the HDDs #A and #B. The vertical axis of Graph 1501 represents a reallocation count. In Graph 1501, change over time in the reallocation count of the HDD #A is illustrated by a solid curve, and change in the reallocation count of the HDD #B is illustrated by a dotted curve.

As illustrated in Graph 1501, the number of days taken for the reallocation count of the HDD #A to increase from 100 to 200 is less than that taken for the reallocation count of the HDD #B to increase from 100 to 200. The reallocation count of the HDD #A reaches 400 when 56 days have elapsed from the start of use. In contrast, the reallocation count of the HDD #B reaches 400 when 58 days have elapsed from the start of use. As such, in comparison of the HDD #A with the HDD #B, there is a risk that the HDD #A having a large rate of increase in the reallocation count is likely to malfunction soon, and thus, the early replacement coefficient adding unit 317 decides the HDD #A as an early replacement coefficient addition target.

As described above, in a case where two or more HDDs are determined to malfunction from the SMART information 111, the RAID card 207 decides a replacement sequence in which the two or more HDDs are replaced in descending order starting from any HDD in the SMART information 111, of which the raw value has increased rapidly. Accordingly, the manager of the HDDs #0 to #3 preferentially replaces any HDD which is highly likely to malfunction soon. As a result, the RAID card 207 is capable of restraining the occurrence of a multi-dead state. The RAID card 207 restrains the occurrence of a multi-dead state, and thus, it is possible to restrain the occurrence of a failure of the RAID system 200. The RAID card 207 prioritizes replacement times of the HDDs via predictive monitoring, and replacement of HDDs is performed as a precautionary measure, and thus, it is possible to disperse risk of the occurrence of a multi-dead state. Since the occurrence of a multi-dead state is restrained, the RAID card 207 is capable of ensuring redundancy.

The RAID card 207 may determine whether there are two or more HDDs which become targets for replacement, based on remaining lives which are respectively equal to current values minus threshold values contained in the SMART information 111 regarding the HDDs #0 to #3. Accordingly, targets for replacement can be determined based on threshold values set by HDD manufacturers, and thus the RAID card 207 is capable of normalizing reference values for monitoring a malfunction even if the HDDs #0 to #3 have different specifications.

In a case where the difference between the remaining lives is less than or equal to the value obtained by dividing the predetermined length of time, which is taken to replace any HDD, by the average value of time intervals between the occurrences of reallocation in the HDDs and the maximum reallocatable sectors count, the RAID card 207 may determine that there are two or more HDDs which have become targets for replacement. Accordingly, the RAID card 207 is capable of restraining the occurrence of malfunctions of two or more HDDs within the predetermined length of time taken to replace any HDD.

The RAID card 207 may decide the sequence of replacing two or more HDDs based on the magnitude relationship between the value, which is equal to the remaining life of any HDD (in which a raw value has been most recently changed) plus the predetermined value, and remaining lives of the remaining HDDs other than the specified HDD. The RAID card 207 decreases the remaining life of any HDD in which a raw value has been most recently updated and which is most likely to malfunction, thereby enabling the manager to replace the HDD sooner.

The RAID card 207 may use reallocatable sectors counts instead of current values contained in the SMART information 111, and may use reallocatable sectors counts instead of threshold values contained in the SMART information 111. Since the RAID card 207 uses current values or threshold values contained in the SMART information 111, even if the manager of the HDDs #0 to #3 does not set threshold values, the RAID card 207 is capable of restraining the occurrence of a multi-dead state based on information contained in the SMART information 111.

The RAID card 207 described in the embodiment can be also realized from an application specific IC (hereinafter, simply referred to as an "ASIC") such as a standard cell application specific integrated circuit (ASIC) or a structured ASIC, or a programmable logic device (PLD) such as a field programmable gate array (FPGA). Specifically, for example, it is possible to manufacture the RAID card 207 by defining functions of the RAID controller 301 of the RAID card 207 via HDL description, performing logic synthesis of the HDL description, and providing the functions to an ASIC or a PLD.

In a case where the embodiment is realized by software, it is possible to realize a storage controlling method described in the embodiment by executing a program prepared in advance via a computer such as a personal computer or a work station. A storage controlling program in the embodiment is recorded in a computer-readable recording medium such as a hard disk, a flexible disk, a compact disc-read only memory (CD-ROM), or a digital versatile disk (DVD). A computer reads the storage controlling program from a recording medium and executes the storage controlling program. The storage controlling program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage controlling device comprising:
   a memory; and
   a processor configured to:
      obtain information on each of a plurality of remaining lives of each of a plurality of storage devices included in a redundancy storage system;
      determine each of a plurality of timings for replacement of each of the plurality of storage devices so that a number of the timings for replacement included in a predetermined time range is less than a predetermined number, each of a plurality of timings for replacement being determined to be earlier than each of the plurality of timings that malfunctions occur in each of the plurality of storage devices corresponding to each of a plurality of timings for replacement, each of the plurality of timings that malfunctions occur being specified based on the obtained information; and
      output information that indicates at least one of the plurality of determined timings for replacement.

2. The storage controlling device according to claim 1, wherein the information includes the number of reallocatable separate regions of each of the plurality of storage devices, and a threshold value for the reallocatable separate regions which corresponds to specifications of each of the plurality of storage devices, and
wherein the processor is configured to estimate each of the plurality of remaining lives based on a value which is equal to the number of reallocatable separate regions of each of the plurality of storage devices, which is contained in the state information regarding each of the plurality of storage devices, minus the threshold value.

3. The storage controlling device according to claim 2, wherein the predetermined time range is determined based on a value obtained by dividing a predetermined length of time, which is taken to replace one of the plurality of storage devices, by an average value of time intervals between the occurrences of reallocation in each of the plurality of storage devices.

4. The storage controlling device according to claim 2, wherein the processor is further configured to determine each of the plurality of timings for replacement based on a magnitude relationship between a value, which is equal to the number of reallocatable separate regions minus a value greater than the threshold value in a storage device of which the number of reallocated separate regions has most recently changed among the plurality of storage devices, and values which are respectively equal to the numbers of reallocatable separate regions minus threshold values in the plurality of storage devices other than the storage device of which the number of reallocated separate regions has most recently changed among the plurality of storage devices.

5. The storage controlling device according to claim 1, wherein the information includes a non-usage ratio indicating a ratio between the number of reallocatable separate regions and the maximum number of reallocatable separate regions of each of the plurality of storage devices, and a threshold value for the non-usage ratio corresponding to the specifications of each of the plurality of storage devices, and
wherein the processor is further configured to estimate each of the plurality of remaining lives based on a value which is equal to a non-usage ratio of each of the plurality of storage devices, which is contained in the state information regarding each of the plurality of storage devices, minus a threshold value for the non-usage ratio.

6. A storage controlling method comprising:
obtaining information on each of a plurality of remaining lives of each of a plurality of storage devices included in a redundancy storage system;
determining each of a plurality of timings for replacement of each of the plurality of storage devices so that a number of the timings for replacement included in a predetermined time range is less than a predetermined number, each of a plurality of timings for replacement being determined to be earlier than each of the plurality of timings that malfunctions occur in each of the plurality of storage devices corresponding to each of a plurality of timings for replacement, each of the plurality of timings that malfunctions occur being specified based on the obtained information; and outputting information that indicates at least one of the plurality of determined timings for replacement.

7. A non-transitory computer-readable recording medium storing a storage controlling program that causes a computer to execute a process comprising:

obtaining information on each of a plurality of remaining lives of each of a plurality of storage devices included in a redundancy storage system;

determining each of a plurality of timings for replacement of each of the plurality of storage devices so that a number of the timings for replacement included in a predetermined time range is less than a predetermined number, each of a plurality of timings for replacement being determined to be earlier than each of the plurality of timings that malfunctions occur in each of the plurality of storage devices corresponding to each of a plurality of timings for replacement, each of the plurality of timings that malfunctions occur being specified based on the obtained information; and outputting information that indicates at least one of the plurality of determined timings for replacement.

* * * * *